Figure 1:
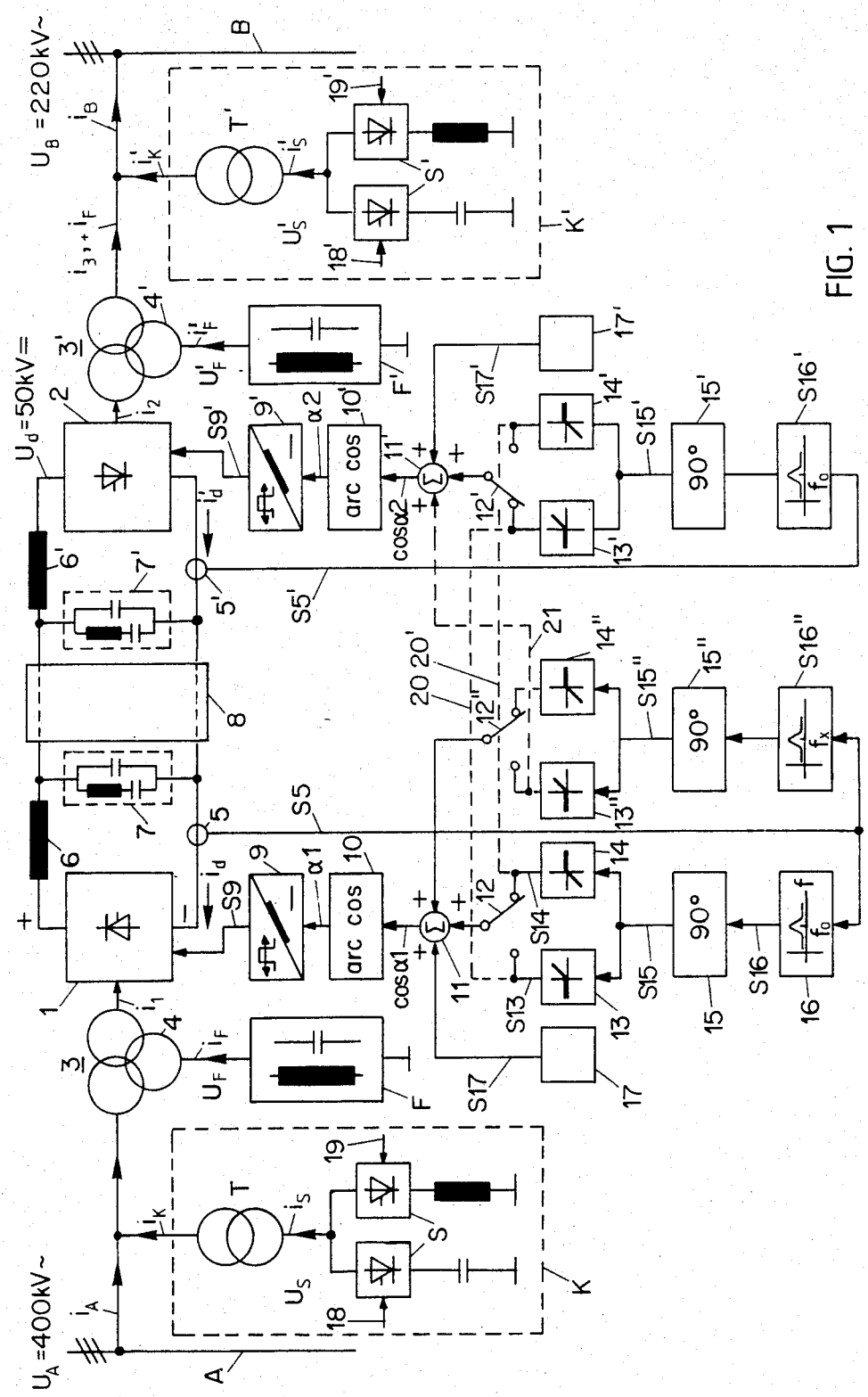

United States Patent [19]

Dähler et al.

[11] Patent Number: 4,639,846

[45] Date of Patent: Jan. 27, 1987

[54] METHOD AND COMPENSATING DEVICE FOR COMPENSATING CURRENT OSCILLATIONS

[75] Inventors: Peter Dähler, Remigen; Peter Neidhart, Untersiggenthal, both of Switzerland; Kadry Sadek, Lauchringen, Fed. Rep. of Germany; Herbert Stemmler, Kirchdorf, Switzerland

[73] Assignee: BBC Brown, Boveri & Company, Limited, Baden, Switzerland

[21] Appl. No.: 830,721

[22] Filed: Feb. 19, 1986

[30] Foreign Application Priority Data

Aug. 16, 1985 [CH] Switzerland ............... 3547/85

[51] Int. Cl.$^4$ .............................................. H02J 1/02
[52] U.S. Cl. .......................................... 363/39; 363/37; 363/51
[58] Field of Search ................... 363/35, 37, 39, 51

[56] References Cited

U.S. PATENT DOCUMENTS

| | | | |
|---|---|---|---|
| 4,521,840 | 6/1985 | Hoadley | 363/51 |
| 4,532,581 | 6/1985 | Miyairi | 363/37 |
| 4,555,750 | 11/1985 | Matsumua et al. | 363/37 |
| 4,563,732 | 1/1986 | Ljungqvist | 363/51 |

FOREIGN PATENT DOCUMENTS 39374  3/1985  Japan .................... 363/39

*Primary Examiner*—Peter S. Wong
*Assistant Examiner*—Judson H. Jones

*Attorney, Agent, or Firm*—Burns, Doane, Swecker & Mathis

[57] ABSTRACT

To reduce unwanted current oscillations such as, for example, of the second harmonic of the system frequency ($f_o$), the firing angles ($\alpha 1$, $\alpha 2$) of a link-circuit rectifier (1) and of a link-circuit inverter (2) are compensatingly acted on in push-pull mode. For this purpose, a direct-current link-circuit current signal (S5, S5'), which contains the instability or the current oscillation to be compensated, is fed by means of a current detector (5, 5') to a bandpass filter (16, 16', 16'') which is tuned to the frequency ($f_o$, $f_x$) of the respective current oscillation. The phase of a bandpass filter output signal (S16) is shifted by 90° trailing in a 90° phase-shifting section (15, 15', 15''). A compensating signal (S15, S15', S15'') obtained in this manner is fed to first and second function generators (13, 13', 13''; 14, 14', 14''). The first function generators allow the positive component (S13) to pass and the second function generators allow the negative component (S14) of the compensating signal to pass. The output signal of the first function generator passes via a switch (12') to a summing section (11') for forming the cosine of the firing angle ($\alpha 2$) of the link-circuit inverter (2). The output signal of the second function generator passes via a switch (12) to a summing section (11) for forming the cosine of the firing angle ($\alpha 1$) of the link-circuit rectifier (1). By these means, the firing angle ($\alpha 2$) of the link-circuit inverter (2) is reduced when the direct-current link-circuit current signal is dropping and the firing angle ($\alpha 1$) of the link-circuit rectifier (1) is increased when it is rising.

9 Claims, 6 Drawing Figures

METHOD AND COMPENSATING DEVICE FOR COMPENSATING CURRENT OSCILLATIONS

The invention is based on a method for compensating current oscillations in a direct-current link circuit between at least one first and second static converter according to the precharacterising clause of claim 1. The invention also relates to a compensating device for carrying out the method.

In the precharacterising clause, the invention refers to a state of the art for methods for compensating current oscillations in a direct-current link circuit between at least one first and second static converter as described in German Pat. No. 2,749,360. In this document, a high-pass wide-band filter, in conjunction with a special static harmonics converter, is used for compensating unwanted harmonic currents in high-voltage direct-current transmission systems. Such a compensating device is relatively elaborate with respect to the components used. Subsequent installation into existing high-voltage direct-current transmission systems requires elaborate refitting operations.

The invention as defined in claims 1 and 7 achieves the object of specifying a method and a compensating device for compensating current oscillations in a direct-current link circuit between at least one first and second static converter, by means of which method and device unwanted current oscillations in a direct-current link circuit can be reduced with less effort.

An advantage of the invention consists in the fact that no additional static harmonics converter and no additional high-pass wide-band filter are required for compensating the unwanted current oscillations. The static converters—rectifier and inverter—which are present in any case, can be used for the compensating process.

In the simplest case, when stored-program control devices are used for the static converters, it is sufficient to change the control program to achieve effective compensation of the current oscillations. The control program can be easily exchanged so that existing installations can be rapidly and simply refitted. The compensation is not restricted to the system frequency and/or its harmonics; instead, current oscillations of almost any frequency can be compensated. In addition, the application is not restricted to high-voltage direct-current transmission systems. The invention can be applied wherever static converters comprising a direct-current link circuit are used, preferably for feeding three-phase machines.

In the text which follows, the invention is explained with the aid of an illustrative embodiment.

FIG. 1 shows a compensating device comprising two static converters which, on the one hand, are connected to each other via a direct-current link circuit and which, on the other hand, are effectively connected to two three-phase systems, and FIGS. 2-6 show signal diagrams for explaining the operation of the compensating device according to FIG. 1, the signal current i being plotted in each case as a function of time t.

In FIG. 1, 1 designates a first static converter or intermediate circuit rectifier which is connected at its direct-current side via smoothing chokes 6 and 6' of a direct-current link circuit and via a direct-voltage transmission line 8 to the direct-current connections of a second static converter or link-circuit inverter 2. In the case of a high-voltage direct-current transmission system, the direct-voltage transmission line 8 can represent a short high-voltage direct-current transmission link or a long-distance high-voltage direct-current transmission link, in which arrangement the first and second static converters are installed at locations which are possibly several 100 km distant from each other. At each installation site, a direct-voltage filter 7 and 7' is connected between a positive transmission line and a negative transmission line of the direct-voltage link circuit, which filter is tuned to characteristic static converter oscillations m . p, where p=pulse number of static converter 1 and 2, and m=1, 2 . . . as whole numbers. Usually, 12-pulse static converters are used where p=12.

The direct-current link circuit has a link-circuit direct voltage $U_d = 50$ kv. At the location of the rectifier 1, a current oscillation detector or current transformer or current detector 5 is provided which detects a direct current $i_d$ and at its output supplies a direct current link-circuit current signal S5. At the location of the inverter 2, a current detector 5' is provided which detects a direct current $i'_d$ and at its output supplies a direct-current link-circuit current signal S5'.

At the alternating-current side, the rectifier 1 is connected via a static converter transformer 3 to a three-phase system A having an alternating voltage of $U_A = 400$ kv. The three-phase system A is connected to a reactive current compensator K which has at its input a transformer T. The transformer T is connected via a switching device S, on the one hand, to a capacitor which is earthed on one side and, on the other hand, to a choke which is earthed on one side. Switch voltage and switch current are designated by $U_S$ and $i_S$, respectively, $i_K$ designates the alternating current of the reactive-current compensator K. The switching device S is provided with a first rectifier, which can be controlled by a firing signal 18, for connecting the capacitor, and a second rectifier, which can be controlled by a firing signal 19, for connecting the choke.

The static converter transformer 3 is provided with a tertiary winding 4 which is connected to a harmonic filter F which is earthed on one side and which is tuned to characteristic harmonics m . p±1 of the rectifier 1. $U_F$ designates the alternating voltage of filter F and $i_F$ designates its alternating current. $i_1$ designates the alternating current at the alternating-current input of the rectifier 1.

The inverter 2 is connected at the alternating-current side via a static converter transformer 3' to a three-phase system B having an alternating voltage of $U_B = 220$ kv. The three-phase system B is connected to a reactive-current compensator K' which is of the same configuration as the reactive-current compensator K. The same applies to an harmonic filter F' which is connected to a tertiary winding 4' of the static converter transformer 3'. Identical parts have corresponding designations and are additionally provided with an apostrophe.

For controlling the link-circuit static converters 1 and 2, commercially available direct-voltage/pulse phase converters with electric isolation, or firing pulse generators 9 and 9' are provided which, at their outputs, supply firing signals S9 and S9' to control inputs of the link-circuit static converters 1 and 2. The firing pulse generators 9 and 9' obtain their firing angle information $\alpha 1$ and $\alpha 2$ via arccos function generators 10 and 10' from commercially available summing sections 11 and 11' which, at their outputs, supply signals which are proportional to cos α 1 and cos α 2. The summing sections 11 and 11' are connected via positive signal inputs, on the one hand, to firing signal control devices 17 and 17', known in themselves, which, at their outputs, supply firing control signals S17 and S17', and, on the other hand, to a common output of electronic switches 12 and 12'. Each switch 12 and 12' has two inputs.

Figure 2:
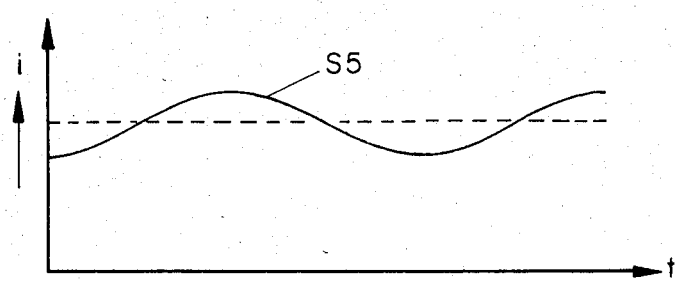
Figure 6:
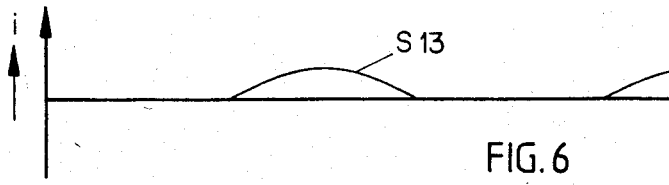

A first or inverter input is connected to the output of a first function generator 13 and 13' for inverter operation, at the output of which only the positive component S13, see FIG. 6, and S13', respectively, of a compensating signal S15, see FIG. 2, or S15' is present. A diode is preferably used as the first function generator 13 and 13'.

Figure 5:
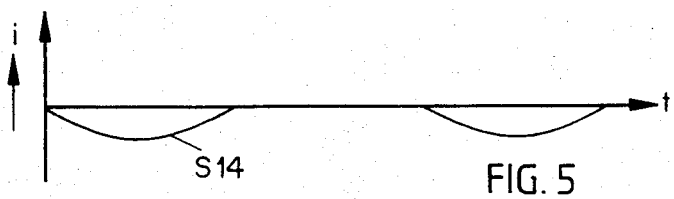

A second or rectifier input is connected to the output of a second function generator 14 and 14' for rectifier operations, at the output of which the negative component S14, see FIG. 5, and S14' of the compensation signal S15 and S15' is present. A diode is preferably used as the second function generator 14 and 14'.

The direct-current link-circuit current signals S5 and S5' obtained from the current detectors 5 and 5' are fed to bandpass filters 16 and 16' which are tuned to the frequency $f_o$ of 50 Hz, which is unwanted in the direct-current link circuit and is therefore to be filtered out, of the two three-phase systems A, B.

Figure 3:
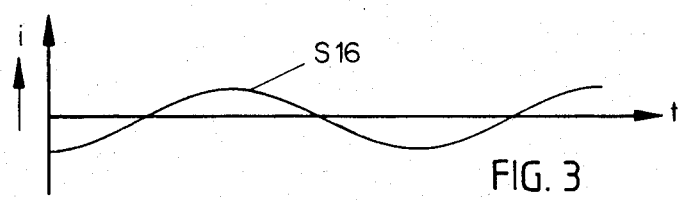

At the output, the bandpass filters 16 and 16' supply bandpass filter output signals S16, see FIG. 3, and S16' which now only contain the alternating-voltage component of the direct-current link-circuit current signals S5 and S5'. The bandpass filter output signals S16 and S16' are fed to $\pi/2$ or 90° phase-shifting sections having a 90° trailing phase-shifting action, which, at their outputs, supply the compensating signals S15 and S15' which are associated with compensating angles $\Delta \cos \alpha$ 1 and $\Delta \cos \alpha$ 2.

In the case where the link-circuit rectifier 1 and link-circuit inverter 2 are accommodated at the same location and at a small distance from each other, the smoothing choke 6', the direct-voltage filter 7', the current detector 5', the bandpass filter 16', the 90° phase-shifting section 15' and the function generators 13' and 14' can be omitted. Instead, the signal output of the first function generator 13 is then connected via the connecting line 20, drawn in dashed lines, to the inverter input of the switch 12' whilst the signal output of the second function generator 14 is connected via the connecting line 20', drawn in dashed lines, to the rectifier input of the switch 12'.

As drawn, the switch position of the switch 12 applies to the first static converter 1 being operated as a rectifier. If the first static converter 1 is to be operated as an inverter, the switch 12 must be switched over. As drawn, the switch position of the switch 12' applies to the second static converter 2 being operated as an inverter. If the second static converter 2 is to be operated as a rectifier, the switch 12' must be switched over. If no operational switching-over of the two static converters 1 and 2 is being considered for the intended application, the switches 12 and 12' can be omitted and the switch positions shown in FIG. 1 can be implemented by connecting lines.

In the case where, in addition to the system frequency $f_o$ of 50 Hz, a predeterminable frequency $f_x$, which deviates from the system frequency, must additionally be filtered out, or the associated current oscillation must be compensated, an additional bandpass filter 16", which is tuned to $f_x$ and a subsequent 90° phase-shifting section 15" with trailing action, followed by function generators 13" and 14" with subsequent switch 12" are provided, in which arrangement the output of the switch 12" is connected to an additional positive signal input of the summing section 11. The operation and circuit arrangement correspond to those described in connection with the frequency $f_o$ above. If both static converters 1 and 2 are spatially far separated from each other, such compensating devices for $f_x$ (not shown) would have to be provided at both locations. If switching-over of operating mode is not being considered for the two static converters 1 and 2, the output of the first function generator 13" would have to be connected via a connecting line 21, shown in dashed lines, to an additional positive signal input of the summing section 11'; the switch 12" could then be omitted and the connection, drawn in the switch position shown, could be implemented as a connecting line. Otherwise, an additional switch (not shown) would have to be provided at the inverter side as has been described above in connection with the frequency $f_o$.

In the text which follows, the problems involved and the operation of the compensating device will be explained in connection with a current oscillation of the system frequency $f_o$, to be compensated.

In the case of a short high-voltage direct-current transmission link, instabilities occurring due to the second harmonic of the system frequency $f_o$ of 50 Hz can in each case lead to the system being disconnected after a few seconds without a special compensating device. The harmonic filters F and F' filter out characteristic harmonics m . p ±1, for example the 11th and 13th harmonic in the case of 12-pulse static converters 1 and 2, but not the second harmonic. The instability oscillations occurring as a result involve the entire system:

direct-current side of the high-voltage direct-current transmission system,
alternating-current sides of the high-voltage direct-current transmission system,
static converter transformers 3 and 3',
harmonic filters F and F',
any existing reactive-load compensators K and K', and
the three-phase systems A and B.

Let it be assumed that the direct current $i_d$ in the direct-current link circuit of the high-voltage direct-current transmission connection displays a current oscillation having a frequency of 50 Hz. Due to the current inverter function of the bridges of the link-circuit invertor 2, a current $i_2$ is generated at the alternating-current side—even with exactly equidistant firing signals S9'—, which current contains a second harmonic and a direct-current component. The bridge circuit of the link-circuit inverter 2 has a frequency-transforming effect. The direct-current component of the current $i_2$ brings the static converter transformer 3' into saturation as a result of which harmonics, including also the second harmonic, are again generated on the system side of the static converter transformer 3'.

The sum of the components of the second harmonics in the alternating current is now impressed on the structure of harmonic filter F', any reactive-current compensator K' present, and the three-phase system B. If this structure has a high impedance at the second harmonic, this will also result in a second harmonic in the alternating voltage $U_B$.

Due to the voltage rectifier function of the bridge of the link-circuit inverter 2, the second harmonic in the alternating voltage U&B! is then transferred to the link-circuit direct voltage $U_B$. But here it no longer appears as second harmonic but, due to the frequency-transforming effect of the bridge of 2, as the fundamental oscillation of 50 Hz. This 50 Hz oscillation in the link-circuit direct voltage $U_d$, in turn, generates a current oscillation or current ripple in the direct current $i_d$ which is also of 50 Hz. This closes the instability circuit.

It depends on the gains and on the phase shifts in the effective circuit described, whether an increasing instability occurs in this effective circuit which always and basically exists. Dangers exist for a high-voltage direct-current transmission system particularly whenever capacitors having a large capacitance are installed either in the harmonic filters F and F' or in the reactive-current compensators K and K' and, together with the impedance of the three-phase systems A, B, form a blocking circuit for the second harmonic current oscillations fed in from the bridge of the second static converter 2.

In principle, the harmonic instability can be damped, and thus made ineffective, in two different ways:
by appropriately dimensioning the harmonic filters F and F' and the reactive current compensators K and K'. If such a measure must be subsequently taken in a high-voltage direct-current system, this is expensive because it includes high-power components.
by an electronic control and regulating device. Even if such a measure must be carried out subsequently, it is comparatively cheap, particularly if stored-program devices are used.

The operation of the compensating device is described by using as an example the arrangement for the frequency $f_o$ at the rectifier side. The same applies correspondingly for the inverter side.

Figure 4:
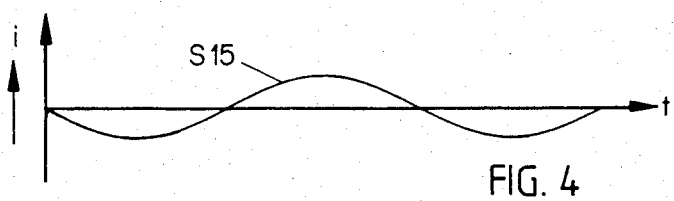

A direct current link-circuit current signal S5, which is proportional to the direct current $i_d$ and which contains the instability oscillation, see FIG. 2, is detected by means of the current detector 5. The mean direct current, which would have been produced without this instability oscillation, is drawn in dashed lines in FIG. 2. In the bandpass filter 16, the direct-current component of the direct-current link-circuit current signal S5 is separated out. The bandpass filter output signal S16, obtained in this manner, see FIG. 3, is phase-shifted by 90° trailing in the 90° phase-shifting section 15. The compensating signal S15 obtained in this manner, see FIG. 4, is fed, on the one hand, to the first function generator 13 for inverter operation and, on the other hand, also to the second function generator 14 for rectifier operation.

The first function generator 13 supplies the signal S13, see FIG. 6, with the positive component S15 via the connecting line 20 and the switch 12' to the summing section 11'. In this section, a positive signal component S13 is added to the "normal" firing control signal S17' whenever the direct-current link-circuit current signal S5 is decreasing, see FIG. 2, with the aim of increasing the cosine of the firing angle $\alpha$ 2 for the link-circuit inverter 2. Since the link-circuit inverter 2 is usually operated at a firing angle $\alpha$ 2 which is slightly below 180°, an increase of cos $\alpha$ 2 means a reduction in $\alpha$ 2. Thus, the direct-current-side direct-voltage at the link-circuit inverter 2 is reduced so that the direct-current $i_d$ is prevented from dropping.

In principle, $i_d$ could also be kept constant by reducing $\alpha$ 1; but this is no longer possible when 1 is already at the "stop" i.e. <15°. This possibility is therefore not being used.

The second function generator 14 supplies the negative signal S14, see FIG. 5, with the negative component of S15 via the switch 12 to the summing section 11. In this section, a negative signal component S14 is added to the "normal" firing control signal S17 whenever the direct-current link-circuit current signal S5 is increasing, see FIG. 2, with the aim of reducing cos $\alpha$ 1 and thus increasing the firing angle $\alpha$ 1 for the link-circuit rectifier 1 which is usually operated at a $\alpha$ 1 of a little above 0°. This reduces the direct-current-side direct voltage of the link-circuit rectifier 1 and thus prevents the direct current $i_d$ from rising.

In principle, $i_d$ could also be kept constant by increasing $\alpha$ 2; however, this is no longer possible when $\alpha$ 2 is already at the "stop", that is to say close to the inverter tripping limit, particularly within the range of 130°–150°. This possibility is therefore not being used.

Using the push-pull method according to the invention, action can be taken to increase or reduce $i_d$ at any time—that is to say even when both the link-circuit rectifier 1 and the link-circuit inverter 2 are operating at the stop ($\alpha$ 1 towards 0°, $\alpha$ 2 towards 180°) in their steady-state condition, decreasing the current by means of firing angle $\alpha$ 1 of the link-circuit rectifier 1 and increasing the current by means of the firing angle $\alpha$ 2 of the link-circuit inverter 2. This makes it possible to balance the current oscillation originating from the harmonic instability out to zero.

Additionally or as an alternative, such balancing out can also be carried out for possibly several current oscillations of a different frequency $f_x$, for which purpose several compensation circuits must then be provided.

The functions of the components 11–16, 11'–16' and 12"–16" can be preferably reproduced by means of a computer program and, together with the conventional control program, can be implemented in a programmable data memory (PROM).

Naturally, the alternating voltages $U_A$ and $U_B$ and the link-circuit direct voltage $U_d$ can assume other values than specified. The system frequency $f_o$ can naturally also be, for example 60 Hz, instead of 50 Hz. Instead of the static converters 1 and 2, two static convertor stations having several series-and/or parallel-connected static converter bridges can be provided, in which arrangement possibly static converter transformers 3 and 3' having for example four windings or several possibly voltage-controllable static converter transformers can be used.

Instead of a current detector 5 and 5' in the direct-current link circuit, three current transformers can also be provided in the alternating-current feeds to the respective static converter 1 and 2, from which a direct-current link-circuit current signal is derived in known manner. A signal containing the instability or the current oscillation to be compensated can naturally also be derived from the link-circuit direct voltage Ud', instead of from the direct current $i_d$, and can be fed at the input to the bandpass filter 16 and 16' and 16".

Additionally or as an alternative to the firing angle, the turn-off angle of the static converters 1 and 2 can also be acted upon. Thus, for example, instead of the firing angle $\alpha$ 1—or additionally—the turn-off angle of the link-circuit rectifier 1 can be increased. Instead of reducing the firing angle $\alpha$ 2—or additionally—the turn-off angle of the link-circuit inverter 2 can be reduced.

The method according to the invention and the compensating device can also be applied to inverters having a direct-voltage link circuit for stabilising direct voltage. It is important that both static converters are acted upon in compensating manner in push-pull mode by using compensating signals which are phase-shifted by 90° trailing. The amplitude of the compensating signals is preferably adjustable.

We claim:

1. Method for compensating current oscillations in a direct-current link circuit between at least one first static converter or link-circuit rectifier (1) and at least one second static converter or link-circuit inverter (2), particularly for compensating current oscillations in a high-voltage direct-current transmission system,
   (a) in which arrangement at least one direct-current link-circuit current signal (S5, S5'), which characterises the current oscillations, is detected and
   (b) an inverter is controlled in dependence on this direct-current link-circuit current signal, with the aim of compensating the current oscillations, characterised in that,
   (c) additionally also at least one phase control angle ($\alpha$ 1) of the link-circuit rectifier (1) is controlled in dependence on at least one direct-current link-circuit current signal.

2. Method according to claim 1, characterised in that
   (a) the compensation control process of the link-circuit rectifier (1) and of the link-circuit inverter (2) is effected by the push-pull method, in such a manner that
   (b) the firing angle ($\alpha$ 2) of the link-circuit inverter (2) is reduced when the direct-current link-circuit current signal decreases, and that
   (c) the firing angle ($\alpha$ 1) of the link-circuit rectifier (1) is increased when the direct-current link-circuit current signal is rising.

3. Method according to claim 2, characterised in that
   (a) at least one frequency filtering operation, implemented as band-pass filtering (16, 16', 16''), is effected in dependence on at least one direct-current link-circuit current signal (S5, S5'), each frequency filtering process being tuned to the frequency of a current oscillation to be compensated,
   (b) that a trailing 90° phase shift is effected in dependence on at least one direct-current link-circuit current signal (S5, S5') and by this means at least one leading phase-shifted, filtered compensation signal (S15, S15', S15'') is generated,
   (c) that the firing angle ($\alpha$ 1) of the link-circuit rectifier (1) is influenced in dependence on the negative component of this compensation signal with the aim of increasing the firing angle, and
   (d) that the firing angle ($\alpha$ 2) of the link-circuit inverter (2) is influenced in dependence on the positive component (S13) of this compensation signal with the aim of reducing the firing angle.

4. Method according to claim 3, characterised in that
   (a) compensation signals (S15, S15') are derived which are different for current oscillations of different frequency ($f_o$, $f_x$) and which are tuned to the respective frequency,
   (b) are added to a firing control signal (S17) of the link-circuit rectifier (1) if the respective compensation signal has a negative sign, and
   (c) are added to a firing control signal (S17') of the link-circuit inverter (2) if the respective compensation signal has a positive sign.

5. Method according to claim 3, characterised in that at least one compensation signal (S15, S15', S15'') is tuned to the fundamental oscillation ($f_o$) of a three-phase system (A, B).

6. Method according to claim 1, characterised in that
   (a) at least one compensation signal (S15, S15', S15'') is formed both at the location of the first static converter (1) and at the location of the second static converter. (2),
   (b) in particular, that the first static converter can be optionally operated as link-circuit rectifier (1) or as link-circuit inverter (2), and
   (c) that the second static converter can be optionally operated as link-circuit inverter (2) or as link-circuit rectifier (1).

7. Compensating device for compensating current oscillations
   (a) in a direct-current link circuit between at least one first static converter or link-circuit rectifier (1) and at least one second static converter or link-circuit invertor (2),
   (b) in particular, for compensating current oscillations in a high-voltage direct-current transmission system
   (c) comprising at least one current detector (5, 5') for detecting a direct-current ($i_d$, $i_{d'}$) of the direct-current link circuit,
   (d) comprising a firing angle control device (17, 10, 9) for the link-circuit rectifier and
   (e) comprising a firing angle control device (17', 10', 9') for the link-circuit inverter, characterised in that
   (f) at least one band-pass filter (16, 16', 16'') is provided which is tuned to a frequency ($f_o$, $f_x$) of a current oscillation to be compensated and the input of which is effectively connected to the current detector,
   (g) that the input of at least one 90° phase-shifting section (15, 15', 15'') is effectively connected with trailing action to an output of the band-pass filter,
   (h) that, for inverter operation, at least one first function generator (13, 13', 13'') is effectively connected at its input to an output of the 90° phase-shifting section and at its output to the firing angle control device (17', 10', 9') of the link-circuit inverter (2), which first function generator only allows positive input signals to pass, and,
   (i) that, for inverter operation, at least one second function generator (14, 14', 14'') is effectively connected at its input to the output of the 90° phase-shifting section and at its output to the firing-angle control device (17, 10, 9) of the link-circuit rectifier (1), which second function generator only allows negative input signals to pass.

8. Compensating device according to laim 7, characterised in that
   (a) the output of at least one first function generator (13, 13', 13'') is effectively connected to a positive signal input of an adding section (11') at the inverter,
   (b) that the output of the adding section is effectively connected via a function generator for arccos (10') at the inverter and
   (c) via a firing pulse generator (9'), following the function generator for arccos, at the inverter to a firing signal input of the link-circuit inverter (2),
   (d) that the output of at least one second function generator (14, 14', 14'') is effectively connected to a positive signal input of an adding section (11) at the rectifier, (e) that the output of this adding section is effectively connected via a function generator for arccos (10) at the rectifier and (f) via a firing pulse generator (9), which follows the function generator for arccos, at the rectifier to a firing pulse input of the link-circuit rectifier (1).

9. Compensating device according to claim 7, characterised in that, (a) both at the location of the first static converter (1) and at the location of the second static converter (2), (b) at least one static converter (5, 5') and (c) at least band-pass filter (16, 16', 16''), in each case followed by a 90° phase-shifting section with trailing action (15, 15', 15''), are provided, (d) in which arrangement, the output of each 90° phase-shifting section is followed by a first function generator for inverter operation (13, 13', 13'') and a second function generator for rectifier operation (14, 14', 14''), and (e) that the output of the first and second function generators is effectively connected, in a manner so as to be switchable via a switch (12, 12', 12''), to a positive signal input of the summing section (11, 11') of the static converter (1, 2) at the respective location.

* * * * *